United States Patent
Crawford (10) Patent No.: US 10,316,793 B2
(45) Date of Patent: Jun. 11, 2019

(54) THRUST REVERSER TRACK BEAM WITH INTEGRATED ACTUATOR FITTING

(71) Applicant: ROHR, Inc., Chula Vista, CA (US)

(72) Inventor: Sara C. Crawford, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 925 days.

(21) Appl. No.: 15/068,010

(22) Filed: Mar. 11, 2016

(65) Prior Publication Data
US 2017/0260928 A1  Sep. 14, 2017

(51) Int. Cl.
| F02K 1/76 | (2006.01) |
| F02K 1/62 | (2006.01) |
| F02K 1/56 | (2006.01) |
| F02K 1/72 | (2006.01) |
| B64D 29/06 | (2006.01) |

(52) U.S. Cl.
CPC .............. *F02K 1/763* (2013.01); *B64D 29/06* (2013.01); *F02K 1/566* (2013.01); *F02K 1/625* (2013.01); *F02K 1/72* (2013.01); *F02K 1/766* (2013.01)

(58) Field of Classification Search
CPC . F02K 1/72; F02K 1/763; F02K 1/766; F02K 1/566; B64D 29/06
See application file for complete search history.

(56) References Cited

U.S. PATENT DOCUMENTS

| 4,030,291 | A | * | 6/1977 | Sargisson | F02K 1/70 239/265.29 |
| 4,533,098 | A | * | 8/1985 | Bonini | B64D 33/04 244/110 B |
| 4,998,409 | A | * | 3/1991 | Mutch | F02K 1/72 239/265.29 |
| 5,039,171 | A | * | 8/1991 | Lore | F02K 1/70 239/265.29 |
| 5,239,822 | A | * | 8/1993 | Buchacher | B64D 29/00 244/110 B |
| 5,251,435 | A | * | 10/1993 | Pauley | B64D 29/00 244/54 |
| 6,546,715 | B1 | * | 4/2003 | Blevins | F02K 1/566 239/265.29 |
| 6,604,355 | B1 | * | 8/2003 | Sternberger | F02K 1/766 239/265.29 |
| 8,127,530 | B2 | * | 3/2012 | Lair | F02K 1/60 239/265.33 |
| 8,302,907 | B2 | | 11/2012 | Welch et al. | |
| 8,720,183 | B2 | | 5/2014 | Welch et al. | |
| 8,959,889 | B2 | | 2/2015 | Howe | |
| 9,387,933 | B2 | * | 7/2016 | James | F02K 1/72 |
| 9,410,501 | B2 | * | 8/2016 | Aten | F02K 1/566 |
| 9,581,109 | B1 | * | 2/2017 | Pinto | F02K 1/72 |
| 10,040,563 | B1 | * | 8/2018 | Pinto | B64D 29/06 |
| 2003/0042358 | A1 | * | 3/2003 | Sternberger | F02K 1/72 244/110 B |
| 2004/0159741 | A1 | * | 8/2004 | Sternberger | F02K 1/72 244/110 B |

(Continued)

*Primary Examiner* — Gerald L Sung
*Assistant Examiner* — Marc J Amar
(74) *Attorney, Agent, or Firm* — Snell & Wilmer, L.L.P.

(57) ABSTRACT

A thrust reverser actuator system fitting and a v-blade may be coupled to a track beam. A portion of the load between a translating sleeve and a fan case may be transmitted through the track beam. The thrust reverser actuator system fitting may comprise an integral v-blade.

9 Claims, 7 Drawing Sheets

(56) References Cited

U.S. PATENT DOCUMENTS

| | | | | |
|---|---|---|---|---|
| 2007/0084964 A1* | 4/2007 | Sternberger | ............ | B64D 29/06 244/53 R |
| 2011/0000086 A1* | 1/2011 | Holland | .................. | B23P 6/005 29/889.1 |
| 2014/0352797 A1* | 12/2014 | Aten | ......................... | F02C 7/04 137/15.1 |
| 2015/0122904 A1 | 5/2015 | Burghdoff et al. | | |
| 2015/0308376 A1* | 10/2015 | James | ....................... | F02K 1/72 239/265.19 |
| 2015/0308378 A1* | 10/2015 | Aten | ......................... | F02K 1/72 239/265.19 |
| 2015/0308382 A1* | 10/2015 | Aten | ...................... | F02K 1/566 60/226.2 |
| 2017/0284337 A1* | 10/2017 | Schrell | .................... | F02K 1/605 |

\* cited by examiner

THRUST REVERSER TRACK BEAM WITH INTEGRATED ACTUATOR FITTING

FIELD

The present disclosure relates to an aircraft engine thrust reverser, and more particularly, to thrust reverser actuator system fittings.

BACKGROUND

A nacelle for a turbofan propulsion system on a typical commercial airliner is a structure which surrounds the engine and provides smooth aerodynamic surfaces for airflow around and into the engine. The nacelle also helps define a bypass air duct through the propulsion system. The nacelle may also include a thrust reverser which can deploy and provide reverse thrust to help slow the aircraft after touchdown. The thrust reverser may create a large load which is transferred at least in part through an actuator. The actuator is typically coupled to a torque box, and load from the actuator is transferred through the torque box and to a v-blade which engages matching geometry on the fan case. The large load may drive the design of the torque box to be large and heavy.

SUMMARY

A thrust reverser for an aircraft nacelle may comprise a track beam comprising a track, a translating sleeve configured to translate along the track, an actuator configured to translate the translating sleeve between a stowed position and a deployed position, a v-blade coupled to the track beam, and a thrust reverser actuator system fitting coupled to the track beam. The actuator may be coupled to the thrust reverser actuator system fitting.

In various embodiments, the v-blade may be coupled to the thrust reverser actuator fitting. The actuator, the thrust reverser actuator system fitting, the track beam, and the v-blade may define a load path between the translating sleeve and a fan case. The thrust reverser actuator system fitting may comprise an integral v-blade. The actuator, the thrust reverser actuator system fitting, and the integral v-blade may define a load path between the translating sleeve and a fan case. The track beam and the thrust reverser actuator system fitting may comprise an integral component. The track beam and the thrust reverser actuator system fitting may be manufactured together by a casting and machining process. The thrust reverser actuator system fitting may be bolted to the hinge beam. The track beam may comprise an elongated body and a face, wherein the thrust reverser actuator system fitting is coupled to the face.

A track beam for a thrust reverser may comprise an elongated body, a face, a thrust reverser actuator system fitting coupled to the face, and a v-blade coupled to the face.

In various embodiments, the v-blade may be located aft of the thrust reverser actuator system fitting. The elongated body, the v-blade, and the thrust reverser actuator system fitting may be an integral component. The elongated body and the thrust reverser actuator system fitting may be formed by a casting and machining process. The thrust reverser actuator system fitting may comprise an upper arm, a lower arm, and a vertical arm. The v-blade may extend from the lower arm the lower arm. The thrust reverser actuator fitting may comprise an integral v-blade.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, a thrust reverser may be configured to direct the flow of bypass air in a forward direction, causing reverse thrust. In this regard, a thrust reverser may comprise a translating sleeve which may be configured to translate forward and aft (e.g., to stow and deploy). The translating sleeve may be configured to translate forward and aft adjacent to at least one of a hinge beam (i.e., the upper track beam) and a latch beam (i.e., the lower track beam). Accordingly, a hinge beam and a latch beam may be referred to herein collectively as track beams and/or a track beam. A thrust reverser actuator system ("TRAS") fitting may be coupled to the hinge beam and/or track beam. In response to deployment of the thrust reverser, load on the blocker doors, translating sleeve, and cascades may be transferred to the fan case through the actuator, a TRAS fitting, track beams, and a v-blade. In various embodiments, the TRAS fitting may comprise an integral v-blade, and the load may be transferred from the actuator to the TRAS fitting, and from the integrated v-blade to the fan case.

Figure 1:
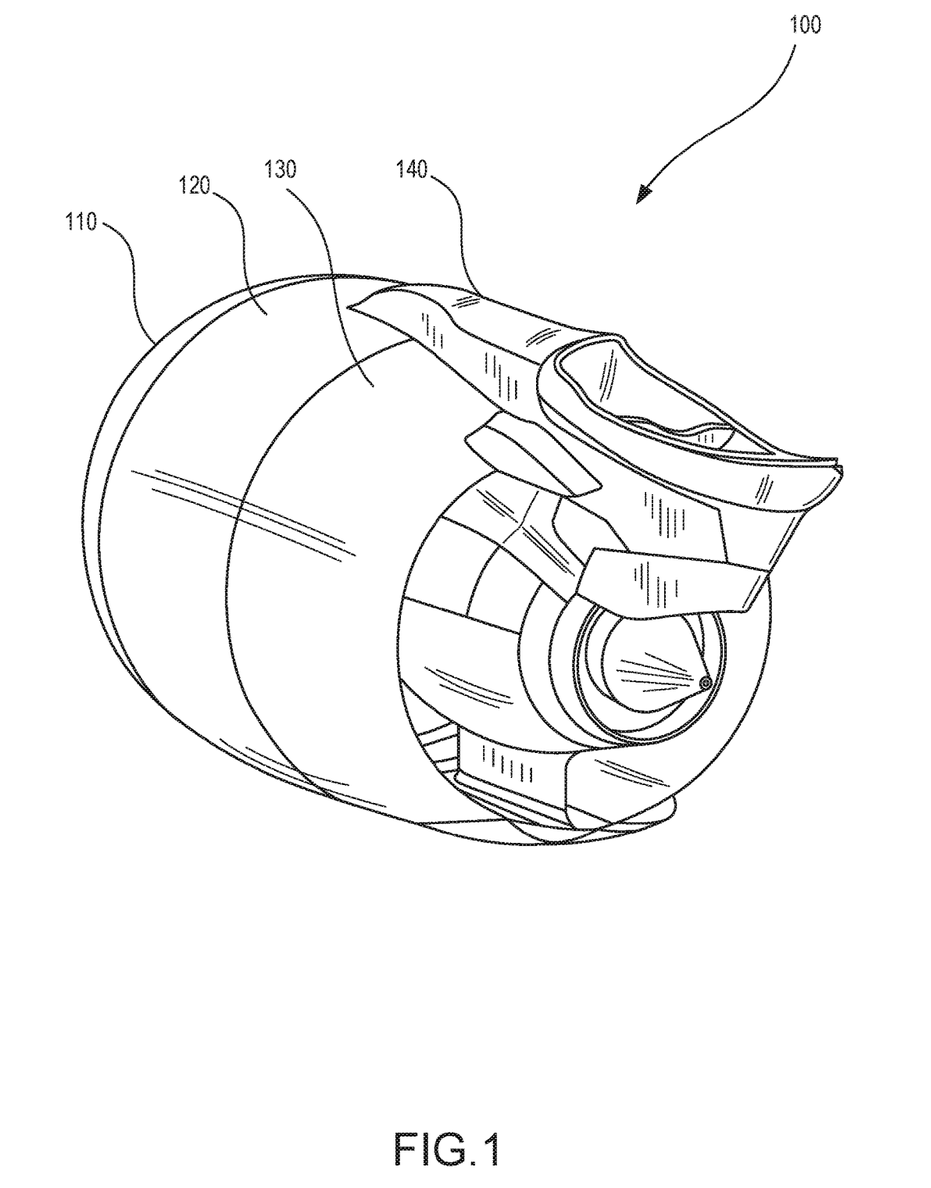
FIG. 1 illustrates a perspective view of a nacelle in accordance with various embodiments.

Referring to FIG. 1, a nacelle 100 for a gas turbine engine is illustrated according to various embodiments. The nacelle 100 may comprise an inlet 110, a fan cowl 120, and a thrust reverser 130. The nacelle 100 may be coupled, directly or indirectly, to a pylon 140, which may mount the nacelle 100 to an aircraft wing or aircraft body. The thrust reverser 130 may comprise a translating sleeve which translates relative to one or more track beams in order to deploy the thrust reverser 130.

Figure 2:
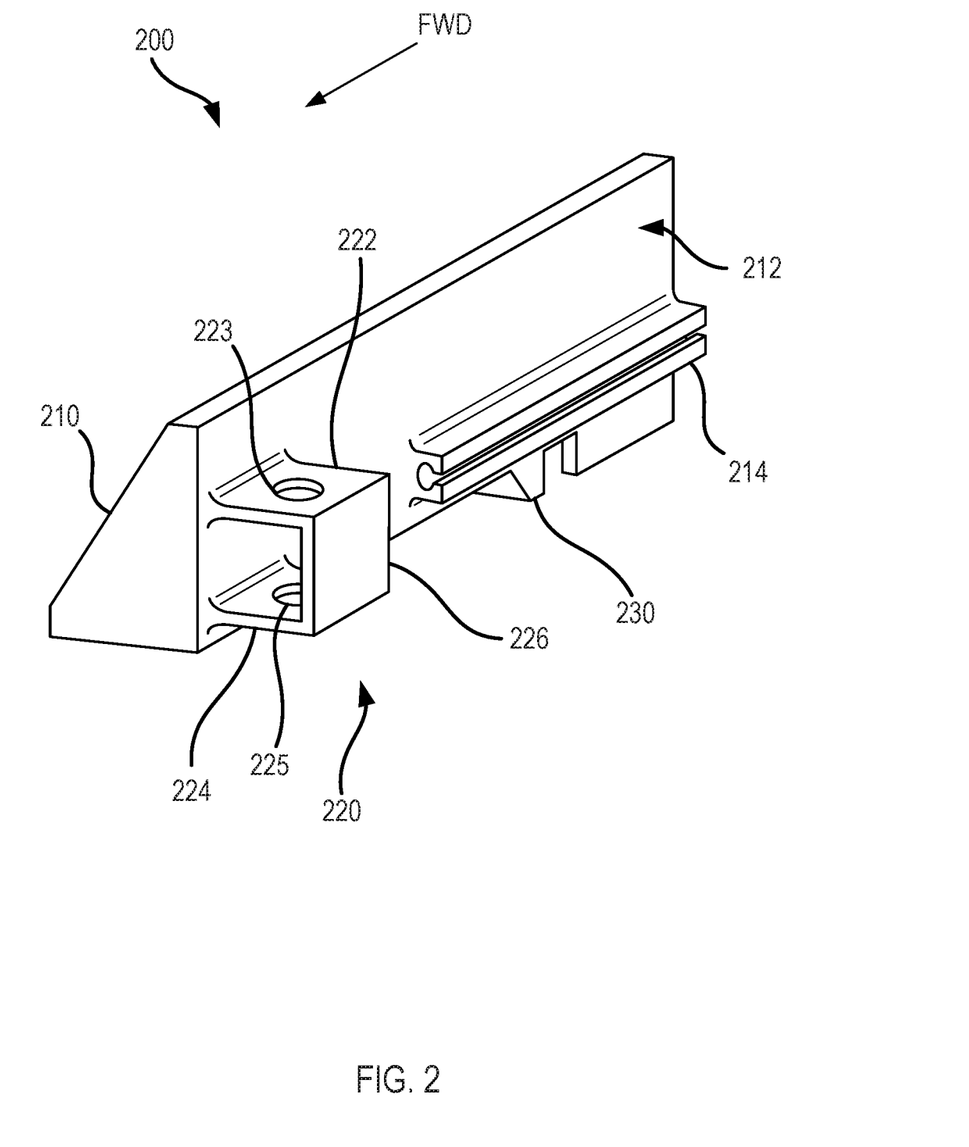
FIG. 2 illustrates a perspective view of a portion of a hinge beam in accordance with various embodiments.

Referring to FIG. 2, a schematic perspective view of a forward portion of a hinge beam 200 is illustrated according to various embodiments. The hinge beam 200 may comprise a generally longitudinally (in the direction of the engine axis) elongated body 210 having a planar face 212. A track 214 may be coupled to the face 212 of the elongated body 210. A translating sleeve for a thrust reverser may include a slider that engages the track 214 to translate the translating sleeve forward and aft along the track 214. The hinge beam 200 may comprise a thrust reverser actuator system (TRAS) fitting 220 formed therewith or mounted directly thereon. The TRAS fitting 220 may be coupled to the face 212 of the elongated body 210. In various embodiments, the TRAS fitting 220 may be coupled to the elongated body 210 with mechanical fasteners or by welding. In various embodiments, the TRAS fitting 220 may be manufactured integrally with the elongated body 210. For example, the hinge beam 200 may be cast and/or forged with the general shape of the elongated body 210 and the TRAS fitting 220, and the final shape may be machined to create the elongated body 210 and the TRAS fitting 220. In various embodiments, the TRAS fitting 220 and the elongated body 210 may be manufactured by additive manufacturing techniques into a single component.

The TRAS fitting 220 may comprise an upper arm 222 and a lower arm 224, each extending perpendicularly from the face 212 of the elongated body 210. A vertical arm 226 may connect the upper arm 222 and the lower arm 224. In various embodiments, the upper arm 222, the lower arm 224, the vertical arm 226, and the face 212 of the hinge beam 200 may form a quadrilateral such as a square or rectangle. The upper arm 222 and the lower arm 224 may each comprise an aperture 223, 225 configured to couple a gimbal to the TRAS fitting 220.

The hinge beam 200 may comprise a v-blade 230 coupled to the hinge beam 200 In various embodiments, the v-blade 230 may be integrally formed with the hinge beam 200. The v-blade 230 may extend inward from the elongated body 210. The v-blade may be configured to transfer loads from the hinge beam 200 to a fan case formed around the bypass fan of a turbofan engine.

Figure 3:
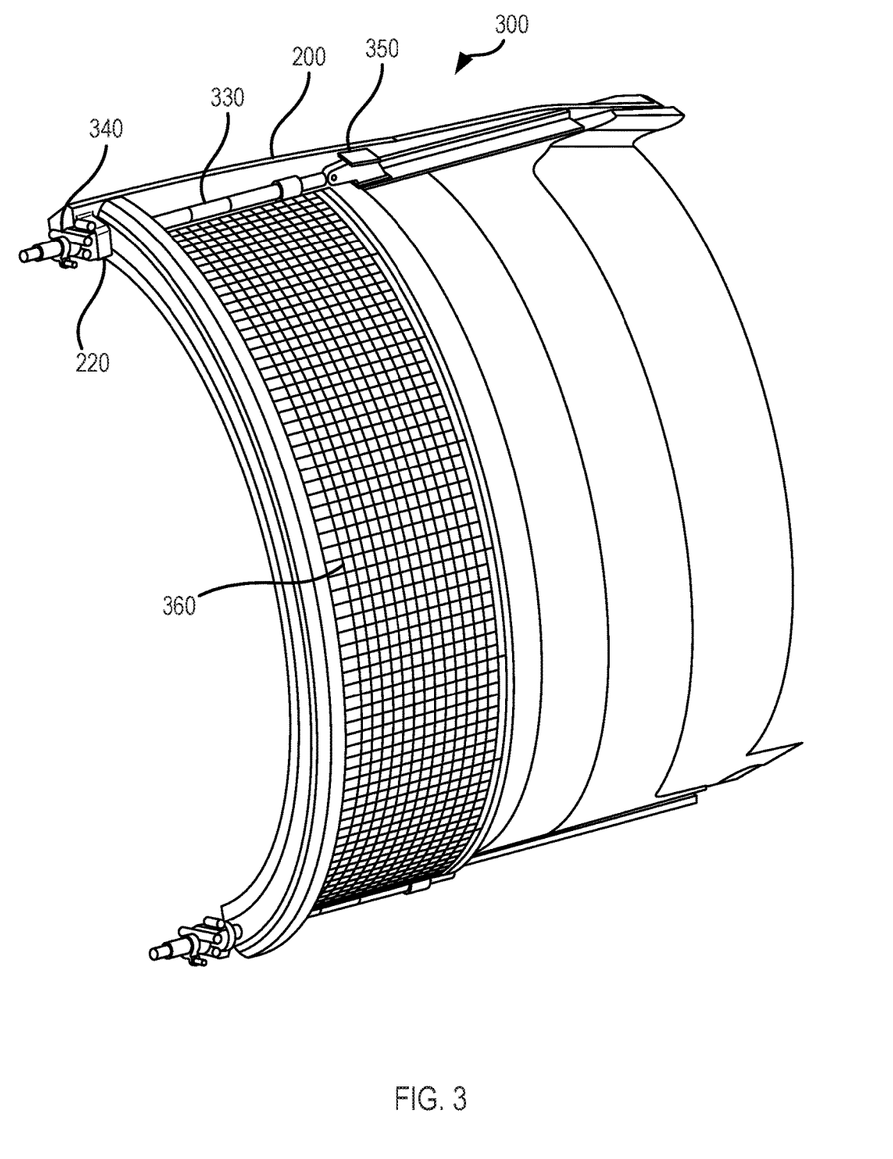
FIG. 3 illustrates a schematic perspective view of a portion of a thrust reverser in accordance with various embodiments.

Referring to FIG. 3, a perspective view (with the outer translating cowl removed) of a portion of a thrust reverser 300 in a stowed position is illustrated according to various embodiments. The thrust reverser 300 comprises a hinge beam 200 with a TRAS fitting 220 coupled to the hinge beam. An actuator 330 is configured to extend and retract to move the thrust reverser 300 between the stowed position and a deployed position. In various embodiments, the actuator 330 may be powered by electrical or hydraulic systems. The actuator 330 may be coupled to a gimbal 340 at the forward end of the actuator 330. The gimbal 340 is in turn located at least partially within and coupled to the TRAS fitting 220. The gimbal 340 provides two axis of rotation for mounting the actuator 330 to avoid any bending loads being created at the mounting joint. The actuator 330 is coupled to an aft TRAS fitting 350. The aft TRAS fitting 350 may be coupled to a translating sleeve to force the translating sleeve in an aft direction to deploy the thrust reverser 300.

In response to deployment of the thrust reverser 300, blocker doors may substantially block the flow of air through the thrust reverser 300 and cause air to exit the thrust reverser 300 through one or more cascades 360. Pressure in the bypass air duct may create a large load on the actuator 330. The load may be transferred through the actuator 330 to the TRAS fitting 220, and through the TRAS fitting 220 to the hinge beam 200. The load may be transferred through the hinge beam 200 to a v-blade attached to the hinge beam 200, and from the v-blade to a fan case.

Figure 4:
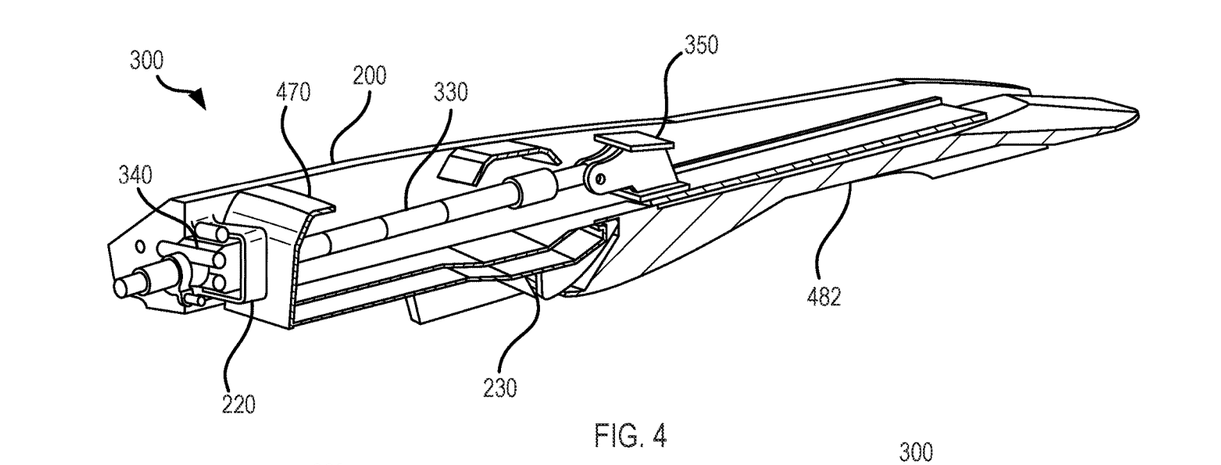
FIG. 4 illustrates a section view of a thrust reverser in a stowed position in accordance with various embodiments.
Figure 5:
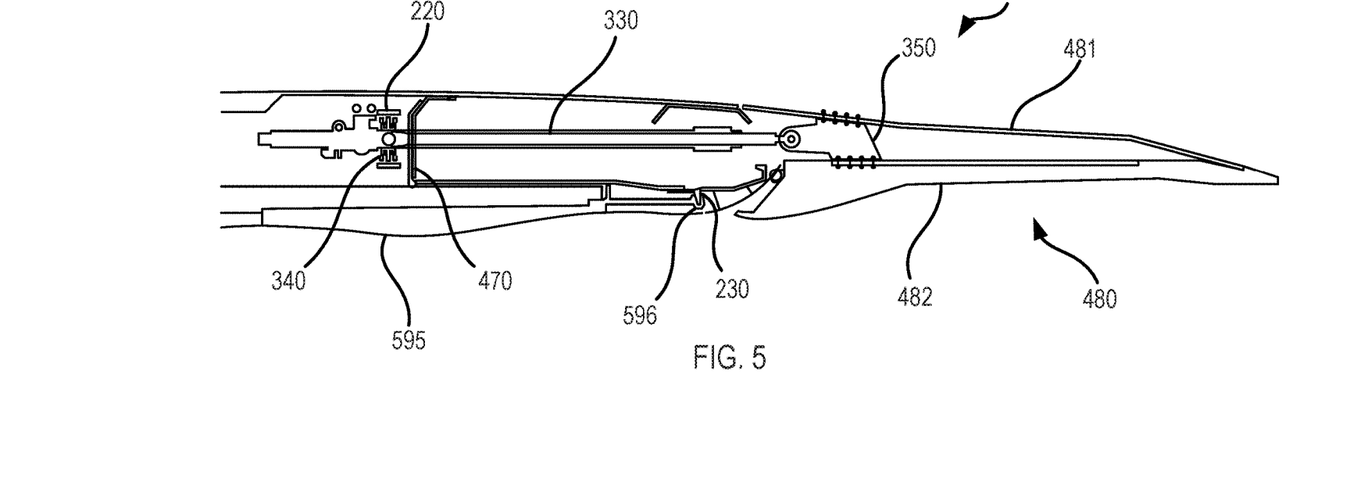
FIG. 5 illustrates a cross-section view of a thrust reverser in a stowed position in accordance with various embodiments.

Referring to FIGS. 4 and 5, a section view with the outer cowl substantially removed and a cross-section view of a portion of the thrust reverser 300 in a stowed position is illustrated according to various embodiments. The TRAS fitting 220 is coupled to the hinge beam 200. The actuator 330 is coupled to the TRAS fitting 220 via the gimbal 340. The actuator 330 extends through an aperture in the torque box 470. In various embodiments, the actuator 330 may not be coupled to or contact the torque box 470. The aft TRAS fitting 350 is coupled to an outer portion 481 and an inner portion 482 of the translating sleeve 480. The v-blade 230 may be coupled to the hinge beam 200 and be configured to transfer loads from the thrust reverser 300 to the fan case 595. The fan case 595 may comprise a v-groove 596. The v-blade 230 may be seated within the v-groove 596. The contact between the v-blade 230 and the v-groove 596 allows the thrust reverser 300 to be opened and closed to engage the v-blade 230 and v-groove 596.

Figure 6:
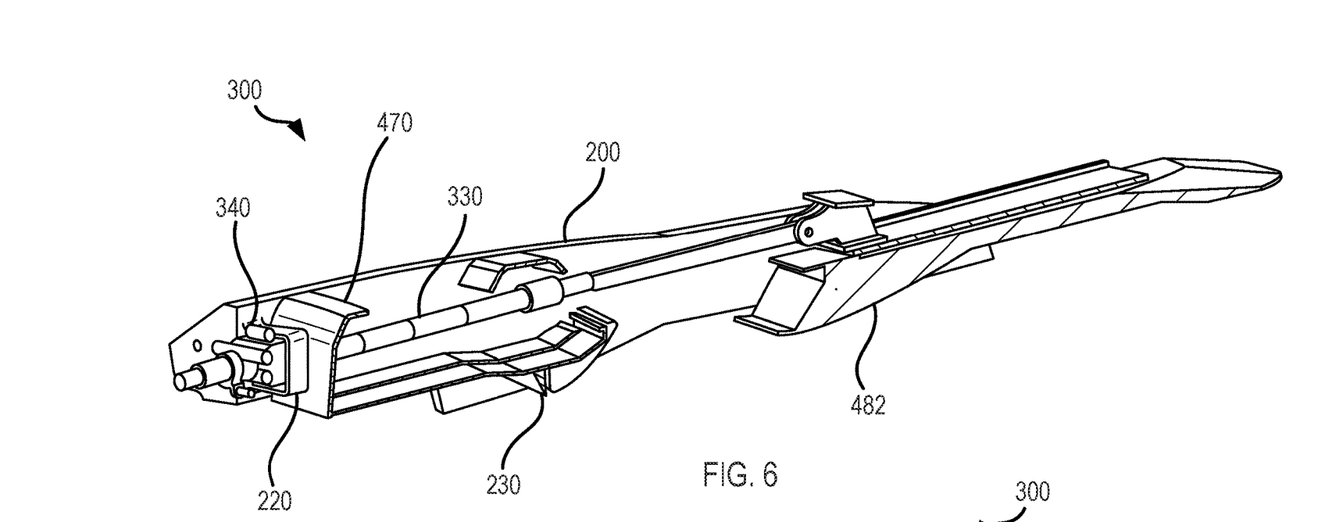
FIG. 6 illustrates a section view of a thrust reverser in a deployed position in accordance with various embodiments.
Figure 7:
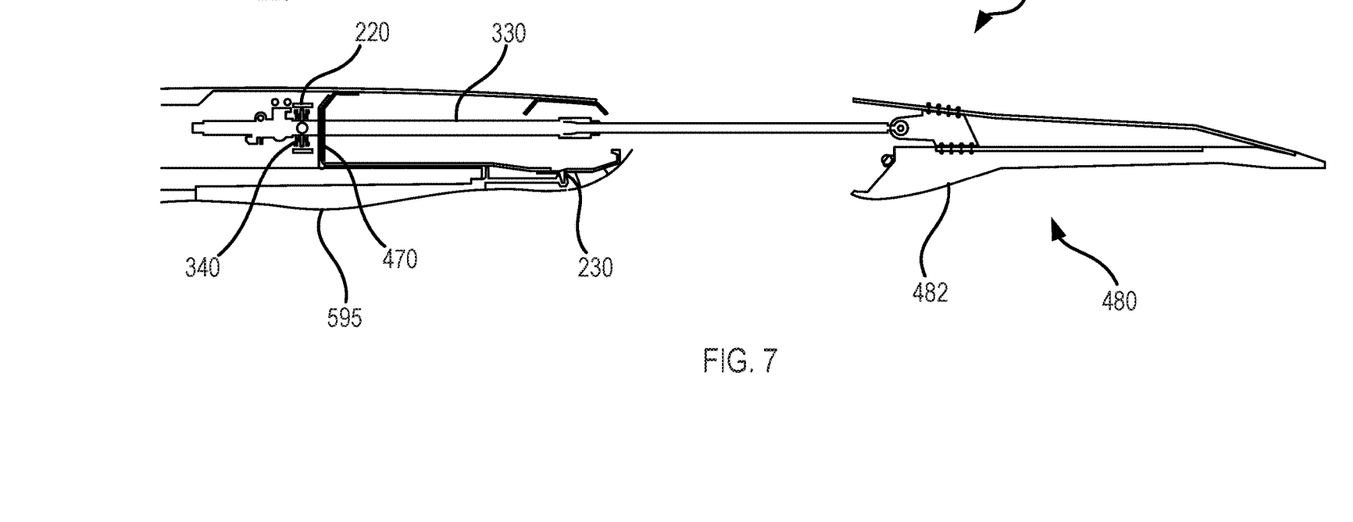
FIG. 7 illustrates a cross-section view of a thrust reverser in a deployed position in accordance with various embodiments.

Referring to FIGS. 6 and 7, a section view with the outer cowl removed and a cross-section view of the thrust reverser 300 in the deployed position is illustrated according to various embodiments. The actuator 330 extends in an aft direction to force the translating sleeve 480 aft. The fan case 595 and the inner portion 482 of the translating sleeve 480 form the outer surface of a bypass air duct. In the deployed position, the translating sleeve 480, associated blocker doors (not shown), and/or cascades may exert a force on the actuator 330 in the aft direction. The load may be transferred from the actuator 330 through the gimbal 340, through the TRAS fitting 220, through the hinge beam 200, and through the v-blade 230 to the fan case 595. Thus, the stiff metallic structure of the hinge beam 200 may be used to transfer load from the translating sleeve 480 to the fan case 595. This may decrease strength requirements of the torque box 470, allowing for a smaller and/or lighter torque box 470 structure. In various embodiments, the TRAS fitting 220 may be coupled to both the hinge beam 200 and the torque box 470. In such embodiments, load from the thrust reverser 300 may be transferred to the v-blade 230 at least partially through the hinge beam 200 and at least partially through the torque box 470.

Figure 8:
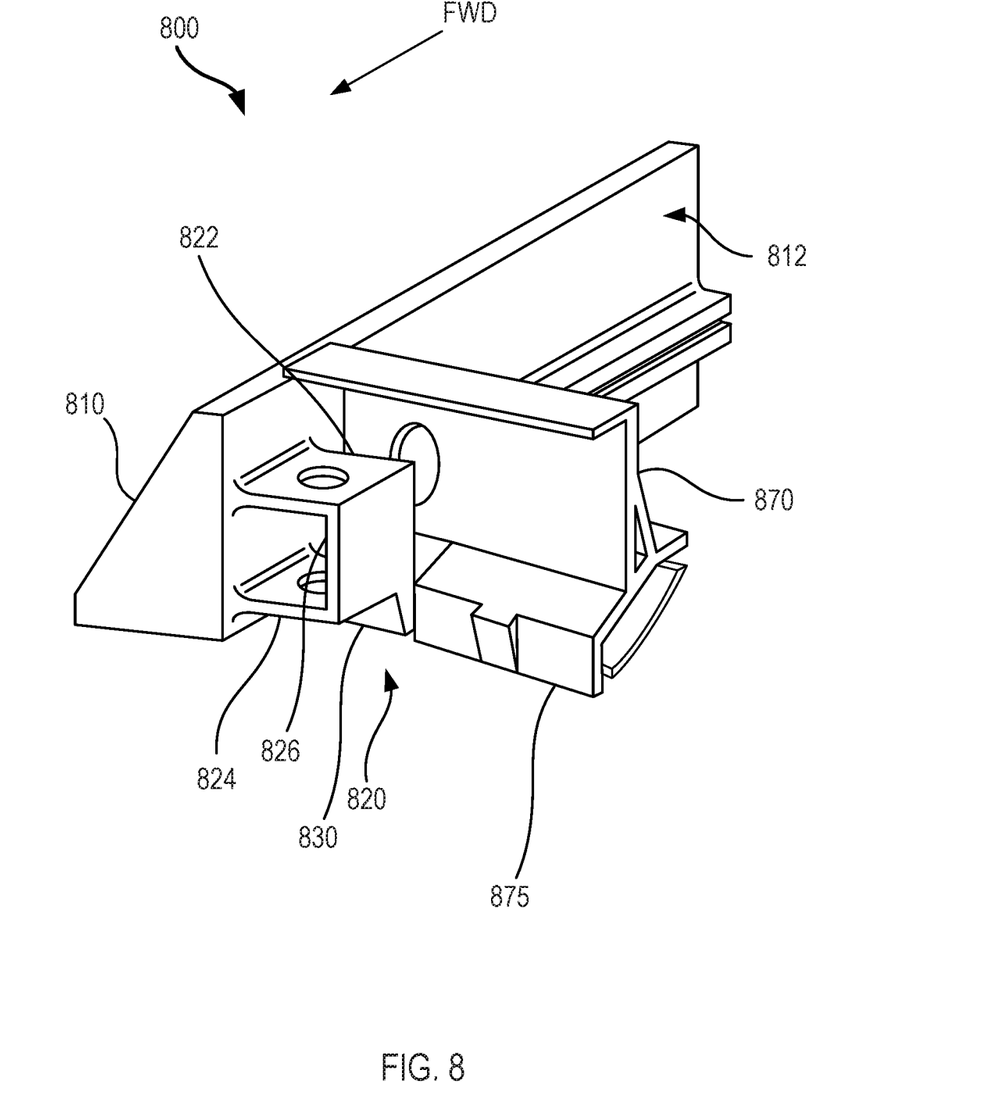
FIG. 8 illustrates a schematic perspective view of a forward portion of a hinge beam with an integrated TRAS fitting and v-blade in accordance with various embodiments.

Referring to FIG. 8, a schematic perspective view of a forward portion of a hinge beam 800 with an integrated TRAS fitting 820 and v-blade 830 is illustrated according to various embodiments. The TRAS fitting 820 and the v-blade 830 may comprise a single integral component. The TRAS fitting 820 and the v-blade 830 may be coupled to the face 812 of the elongated body 810. In various embodiments, the TRAS fitting 820 and the v-blade 830 may be coupled to the elongated body 810 with bolts or by welding. In various embodiments, the TRAS fitting 820 and the v-blade 830 may be manufactured integrally with the elongated body 810. For example, the hinge beam 800 may be cast and/or forged with the general shape of the elongated body 810, the TRAS fitting 820, and the v-blade 830, and the final shape may be machined to create the elongated body 810, the TRAS fitting 820, and the v-blade 830.

The TRAS fitting 820 may comprise an upper arm 822 and a lower arm 824, each extending perpendicularly from the face 812 of the elongated body 810. A vertical arm 826 may connect the upper arm 822 and the lower arm 824. In various embodiments, the upper arm 822, the lower arm 824, the vertical arm 826, and the face 812 of the hinge beam 800 may form a quadrilateral such as a square or rectangle. The v-blade 830 may extend from an aft portion of the TRAS fitting 820. The v-blade 830 may be configured to transfer a load from the TRAS fitting 820 directly to a fan case.

A torque box 870 may comprise a torque box v-blade 875. The v-blade system may comprise the v-blade 830 coupled to the hinge beam 800, a v-blade similarly coupled to a latch beam, and the torque box v-blade 875 which extends circumferentially from the hinge beam 800 to the latch beam.

Figure 9:
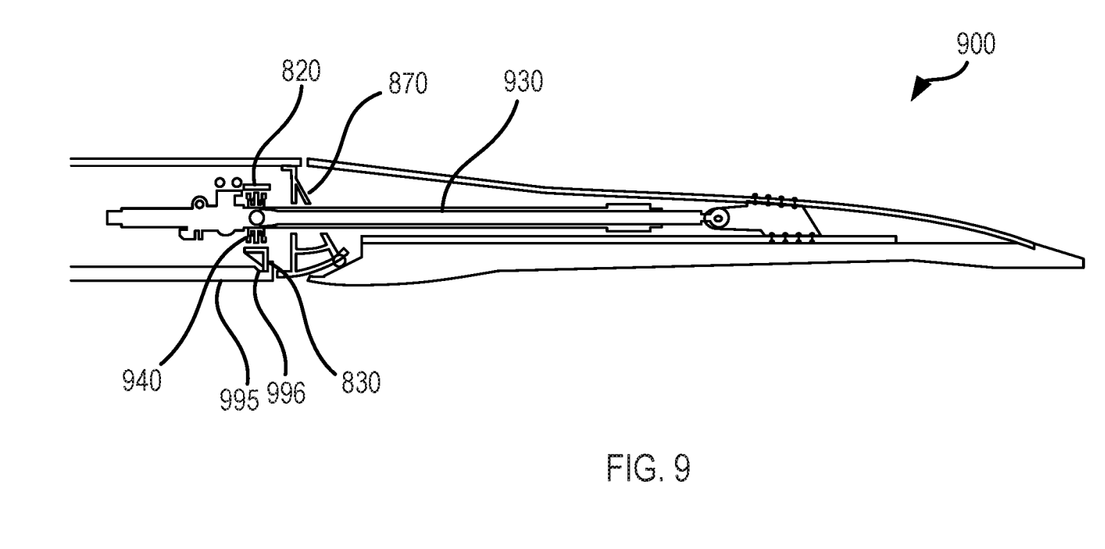
FIG. 9 illustrates a cross-section view of a thrust reverser in a stowed position with an integrated TRAS fitting and v-blade in accordance with various embodiments.

Referring to FIG. 9, a cross-section view of a portion of a thrust reverser 900 in a stowed position is illustrated according to various embodiments. The TRAS fitting 820 is coupled to the hinge beam. The actuator 930 is coupled to the TRAS fitting 820 via the gimbal 940. The actuator 930 extends through an aperture in the torque box 870. In various embodiments, the actuator 930 may not be coupled to or contact the torque box 870. The v-blade 830 may be coupled to the hinge beam and the TRAS fitting 820 and be configured to transfer loads from the thrust reverser to the fan case 995. The fan case 995 may comprise a v-groove 996. The v-blade 830 may be seated within the v-groove 996. The contact between the v-blade 830 and the v-groove 996 allows the thrust reverser to be opened and closed to engage the v-blade 830 and v-groove 996.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

I claim:

1. A thrust reverser for an aircraft nacelle comprising:
   a torque box having a front wall;
   a hinge beam comprising:
      an elongated body having a planer face;
      a track disposed on the planer face;
      a v-blade coupled to the hinge beam; and
      a thrust reverser actuator system fitting disposed axially forward the front wall of the torque box on the planer face;
   a translating sleeve configured to translate along the track; and
   an actuator configured to translate the translating sleeve between a stowed position and a deployed position, wherein the actuator is coupled to the thrust reverser actuator system fitting.

2. The thrust reverser of claim 1, wherein the v-blade is coupled to the thrust reverser actuator system fitting.

3. The thrust reverser of claim 2, wherein the actuator, the thrust reverser actuator system fitting, the hinge beam, and the v-blade define a load path between the translating sleeve and a fan case.

4. The thrust reverser of claim 1, wherein the v-blade is an integral v-blade.

5. The thrust reverser of claim 4, wherein the actuator, the thrust reverser actuator system fitting, and the integral v-blade define a load path between the translating sleeve and a fan case.

6. The thrust reverser of claim 1, wherein the hinge beam and the thrust reverser actuator system fitting comprise an integral component.

7. The thrust reverser of claim 6, wherein the hinge beam and the thrust reverser actuator system fitting are manufactured together by a casting and machining process.

8. The thrust reverser of claim 1, wherein the thrust reverser actuator system fitting is bolted to the hinge beam.

9. A thrust reverser for an aircraft nacelle comprising:
   a torque box having a front wall and a torque box v-blade;
   a hinge beam comprising:
      an elongated body having a planer face;
      a track disposed on the planer face; and
      a thrust reverser actuator system fitting disposed axially forward the front wall of the torque box on the planer face, the thrust reverser actuator system fitting having a fitting v-blade;
   a translating sleeve configured to translate along the track; and
   an actuator configured to translate the translating sleeve between a stowed position and a deployed position, wherein the actuator is coupled to the thrust reverser actuator system fitting.

\* \* \* \* \*